G. W. Lombard,
Hand Saw Mill.
No. 112,156. Patented Feb. 28, 1871.
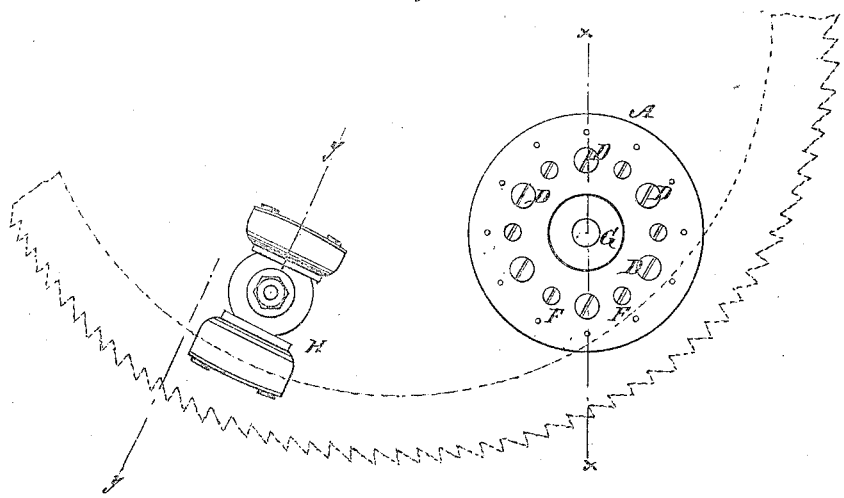
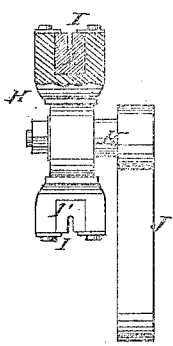
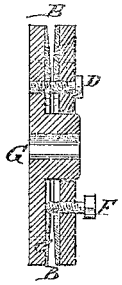
Witnesses:
Chas. Nida
Alex. F. Roberts
Inventor:
G. W. Lombard
per Munn & Co.
Attorneys.

United States Patent Office.

GEORGE W. LOMBARD, OF WESTMINSTER, MASSACHUSETTS.

Letters Patent No. 112,156, dated February 28, 1871.

IMPROVEMENT IN SAWING-MACHINES.

The Schedule referred to in these Letters Patent and making part of the same.

*To all whom it may concern:*

Be it known that I, GEORGE W. LOMBARD, of Westminster, in the county of Worcester and State of Massachusetts, have invented a new and useful Improvement in Operating Annular Circular-Saws; and I do hereby declare that the following is a full, clear, and exact description thereof, which will enable others skilled in the art to make and use the same, reference being had to the accompanying drawing forming part of this specification.

The object of this invention is to overcome some very serious difficulties which have been met with in operating annular circular-saws.

Metallic driving-wheels and metallic guides or supports have hitherto been so applied to the saw that the blade of the saw has been brought in contact with the metal, which draws or expands the inner circle of the saw, causing it to crack or break.

My invention relates to means for operating circular-saws, and consists in certain features of improvement which will be first described in connection with all that is necessary to their full understanding, and then specified in the claim.

In the accompanying drawing—

Figure 1 represents a side view of a section of an annular circular saw, with the driving-wheel and supports applied.

Figure 2 is a cross-section of fig. 1, on the line x x, showing the beveled groove in the driving-wheel, and the saw-blade lining or facing therein.

Figure 3 represents a sectional view of the support, the section being on the line y y of fig. 1, showing the grooves for the saw with the lining therein, and also the arm by which the support is adjusted and held in position.

Similar letters of reference indicate corresponding parts.

A is the driving-wheel;
B is the beveled groove; and
C, the lining or facing therein, the latter being made of raw-hide or of some equivalent material, and fastened in the groove by means of rivets, as seen in fig. 2, or in any other suitable manner.

The driving-wheel is made in two parts, which are fastened together by screws D, and adjusted to vary the groove in width by the set-screws F.

The wheel is rapidly rotated by a shaft through the hub G, and the saw is driven by the friction on its back edge produced in the groove of the wheel.

By this arrangement the power is applied near the point of resistance or cut of the saw.

H is the support, any required number of which may be used to properly support and guide the saw, arranged substantially as seen in fig. 1.

I represents the grooves in the ends of the support, which are made in the lining I', and vary in depth to adapt the support to wide or narrow saws.

The support is fastened to the arm J by a screw or bolt and nut, so that it may be turned on the center pin K to adjust the deep or shallow groove, to the saw.

The stationary supports insure greater durability at less expense than the rotary supports.

By the use of the facing or lining C, the saw is protected from the injurious effects of contact with metal.

Having thus described my invention,

I claim as new and desire to secure by Letters Patent—

1. The saw-supports H, grooved at I, and provided with lining I', as described, and for the purpose specified.

2. The grooved and groove-lined driving-wheel A, formed in two parts, and adjustably attached together, as and for the purpose described.

GEORGE W. LOMBARD.

Witnesses:
HENRY J. NUTTING,
FRANKLIN LOMBARD.